US 9,372,724 B2

(12) United States Patent
Xu et al.

(10) Patent No.: US 9,372,724 B2
(45) Date of Patent: Jun. 21, 2016

(54) SYSTEM AND METHOD FOR CONDITIONAL TASK SWITCHING DURING ORDERING SCOPE TRANSITIONS

(71) Applicants: Zheng Xu, Austin, TX (US); Tommi M. Jokinen, Austin, TX (US); William C. Moyer, Dripping Springs, TX (US)

(72) Inventors: Zheng Xu, Austin, TX (US); Tommi M. Jokinen, Austin, TX (US); William C. Moyer, Dripping Springs, TX (US)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 93 days.

(21) Appl. No.: 14/231,789

(22) Filed: Apr. 1, 2014

(65) Prior Publication Data
US 2015/0277973 A1 Oct. 1, 2015

(51) Int. Cl.
*G06F 9/48* (2006.01)

(52) U.S. Cl.
CPC ............. *G06F 9/4843* (2013.01); *G06F 9/48* (2013.01)

(58) Field of Classification Search
None
See application file for complete search history.

(56) References Cited

U.S. PATENT DOCUMENTS

| 6,148,299 | A  | * | 11/2000 | Yoshimoto | G06F 9/466 |
| 6,263,358 | B1 | * | 7/2001  | Lee | G06F 9/4881 718/100 |
| 6,430,594 | B1 | * | 8/2002  | Akiyama | G06F 9/461 718/102 |
| 6,470,376 | B1 | * | 10/2002 | Tanaka | G06F 9/30087 375/E7.093 |
| 6,721,309 | B1 |   | 4/2004  | Stone et al. | |
| 7,594,234 | B1 |   | 9/2009  | Dice | |
| 7,770,172 | B2 |   | 8/2010  | Clift | |
| 7,895,431 | B2 |   | 2/2011  | Bouchard et al. | |
| 8,015,567 | B2 | * | 9/2011  | Hass | H04L 49/15 370/258 |
| 8,189,591 | B2 |   | 5/2012  | Blaker et al. | |
| 8,381,218 | B2 | * | 2/2013  | Periorellis | G06F 9/46 718/102 |
| 2002/0194328 | A1 | * | 12/2002 | Hallenbeck | G04G 13/021 709/224 |
| 2005/0055504 | A1 | * | 3/2005 | Hass | H04L 49/00 711/122 |
| 2006/0085793 | A1 | * | 4/2006 | McKenney | G06F 9/526 718/100 |
| 2008/0062927 | A1 | * | 3/2008 | Zhu | H04L 49/109 370/331 |
| 2009/0172675 | A1 | * | 7/2009 | Grossman | G06F 9/52 718/101 |
| 2010/0262976 | A1 | * | 10/2010 | Maruyama | G06F 9/462 718/108 |
| 2010/0287360 | A1 | * | 11/2010 | Maruyama | G06F 9/52 712/225 |
| 2011/0083000 | A1 | * | 4/2011 | Rhoades | G06F 1/10 712/22 |
| 2011/0093660 | A1 | * | 4/2011 | Pelley, III | G06F 15/16 711/141 |
| 2012/0008631 | A1 | * | 1/2012 | Hass | H04L 49/00 370/394 |
| 2012/0137298 | A1 | * | 5/2012 | Periorellis | G06Q 10/06313 718/102 |
| 2012/0272247 | A1 | * | 10/2012 | Scott | G06F 9/4881 718/108 |
| 2013/0128896 | A1 | * | 5/2013 | Munoz | H04L 49/9078 370/412 |

OTHER PUBLICATIONS

U.S. Appl. No. 14/231,784, filed Apr. 1, 2014, entitled "System and Method for Conditional Task Switching During Ordering Scope Transistions".

(Continued)

*Primary Examiner* — Matthew Brophy (57) ABSTRACT

A data processing system includes a processor core and a hardware module. The processor core performs tasks on data packets. The hardware module stores a first ordering scope identifier at a first storage location of the ordering scope manager. The first ordering scope identifier indicates a first ordering scope that a first task is operating in. The ordering scope manager increments the first ordering scope identifier to create a new ordering scope identifier. In response to determining that the processor core is authorized to transition the first task from the first ordering scope to a second ordering scope associated with the new ordering scope identifier, the ordering scope manager provides hint information to the processor core. The processor core transitions from the first ordering scope to the second ordering scope without completing a task switch in response to the hint information.

20 Claims, 4 Drawing Sheets

(56) References Cited

OTHER PUBLICATIONS

U.S. Appl. No. 14/300,762, filed Jun. 10, 2014, entitled "System and Method for Conditional Task Switching During Ordering Scope Transitions".

Non-Final Office Action mailed Oct. 1, 2015 for U.S. Appl. No. 14/231,784, 11 pages.

* cited by examiner

SYSTEM AND METHOD FOR CONDITIONAL TASK SWITCHING DURING ORDERING SCOPE TRANSITIONS

CROSS-REFERENCE TO RELATED APPLICATION(S)

The present application is related to co-pending U.S. patent application Ser. No. 14/231,384, entitled "SYSTEM AND METHOD FOR CONDITIONAL TASK SWITCHING DURING ORDERING SCOPE TRANSITIONS" filed on Apr. 1, 2014, and co-pending U.S. patent application Ser. No. 14/300,362, entitled "SYSTEM AND METHOD FOR CONDITIONAL TASK SWITCHING DURING ORDERING SCOPE TRANSITIONS" filed on Jun. 10, 2014, the entirety of which are herein incorporated by reference.

FIELD OF THE DISCLOSURE

This disclosure generally relates to data processing, and more particularly to a system and method for task switching.

BACKGROUND

Multi-core processing systems often perform operations on packet data. The packet data is associated with a program identifier (program ID) that indicates a particular program to be executed by a core to process the packet data. A task manager or work scheduler can assign a particular core to execute the program to process the packet data. This combination of a program and corresponding packet data represents a specific task that is to be executed by the processing system, and in particular, once assigned to the core, this combination represents a specific task of the core. Each core can be assigned multiple tasks.

A task may be divided into one or more portions that are referred to as ordering scopes. When a task has multiple ordering scopes, each ordering scope generally represents an operation to be performed by the task without being interrupted by a task switch. For example, an ordering scope can correspond to a portion of the task's program code that is executed by the core between task switch instructions. An ordering scope can also correspond to an operation to be performed by a non-core resource. For example, an ordering scope can correspond to an operation for which control has been transferred from the core to the non-core resource, such as to a hardware accelerator, to execute on the packet data. Note that when an ordering scope is being executed by a non-core resource, the core assigned to process the ordering scope may not be actively processing that ordering scope. In such case, the core can be used to execute another ordering scope of the task, or to execute another task. When the ordering scope associated with the non-core resource is finished executing on the packet data, the core can resume executing on the original ordering scope, or on a next ordering scope.

A processor core can switch between tasks on ordering scope boundaries (e.g., after completion of one ordering scope and before starting a next ordering scope). However, when switching between tasks, the processor core is typically able to store context information (e.g., state information) for its current task before exiting the current task. The process of saving a particular core's context information for an executing task, and loading stored context information associated with a next task to be processed by the core, is generally referred to as context/task switching. Task switching provides the benefit of enabling a processor core to execute multiple tasks in a time-sliced manner. One cost of task switching is that there is some delay in switching between tasks due to the saving of current context information and the loading of stored context information for the next task. This cost is especially high in systems where a full context switch occurs for each context switch instruction (e.g., at every ordering scope boundary) with no regard as to the next task.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

A data processing system is disclosed that has a work scheduler, an ordering scope manager, and multiple processor cores. For each received data packet, the work scheduler of the data processing system determines a program identifier (program ID) of a program that is to process the packet data, and an ordering scope identifier that identifies the initial ordering scope of that program, which also corresponds to the start of the program. The work scheduler further assigns a unique task identifier (task ID) that corresponds to the received data packet and to the program that is to process the data payload of the data packet (the packet data). Thus, the task ID identifies a task that executes a particular instantiation of a program to process a particular packet. Typically, tasks associated with different packets of the same data stream will have the same ordering scopes by virtue of executing different instantiations of the same program. The work scheduler further assigns each task to a processor core for processing by providing the task's identifier and its initial ordering scope identifier to one of the plurality of cores. According to an embodiment, an ordering scope table is maintained by an ordering scope manager of the data processing system, where each entry of the ordering scope table corresponds to a specific task. For example, the data processing system that can handle up to 256 tasks across all of its processor cores will have an ordering scope table with 256 entries.

Once a task is assigned to a processor core, the core can wait to request permission from the ordering scope manager before requesting permission to begin executing the task. Thus, even if the processor core has only one assigned task, it will wait to execute the assigned task until it receives permission to do so from the ordering scope manager. The ordering scope manager can determine if a newly assigned task will be executed based on information stored at the ordering scope table. According to an embodiment, the ordering scope manager will determine that the task cannot execute in its initial ordering scope if the initial ordering scope is blocked by another task. For example, the initial ordering scope of a task can be considered blocked from being exclusively executed when another task is already executing the same ordering scope in an exclusive mode. If the requested ordering scope is available for execution by the task (not blocked), the ordering scope manager notifies the assigned processor core that it is enabled to begin executing the task in the initial ordering scope (e.g., the task is enabled).

When the task is enabled, a processor core can begin executing instructions of the task that are stored at an address associated with the task's current ordering scope identifier. The ordering scope manager can also determine whether hint information can be provided to individual tasks based upon the state of the ordering scope table. Hint information can be used to allow a processor core to determine whether it needs permission from the ordering scope manager to immediately exit its current task without performing a task switch. Thus, if no hint information is available for an executing task, the core will have to explicitly request permission to exit its current task, and will have to implement a full task switch when the current ordering scope is complete.

As used herein, the term data packet, or the term packet, is intended to mean either a data packet with a header and payload portion that is associated with a particular packetized data stream, the data of such a packet, or any other received datum of a stream of data that may not be associated with a specific header. Various embodiments of the present disclosure will be better understood with reference to FIGS. 1-4.

Figure 1:
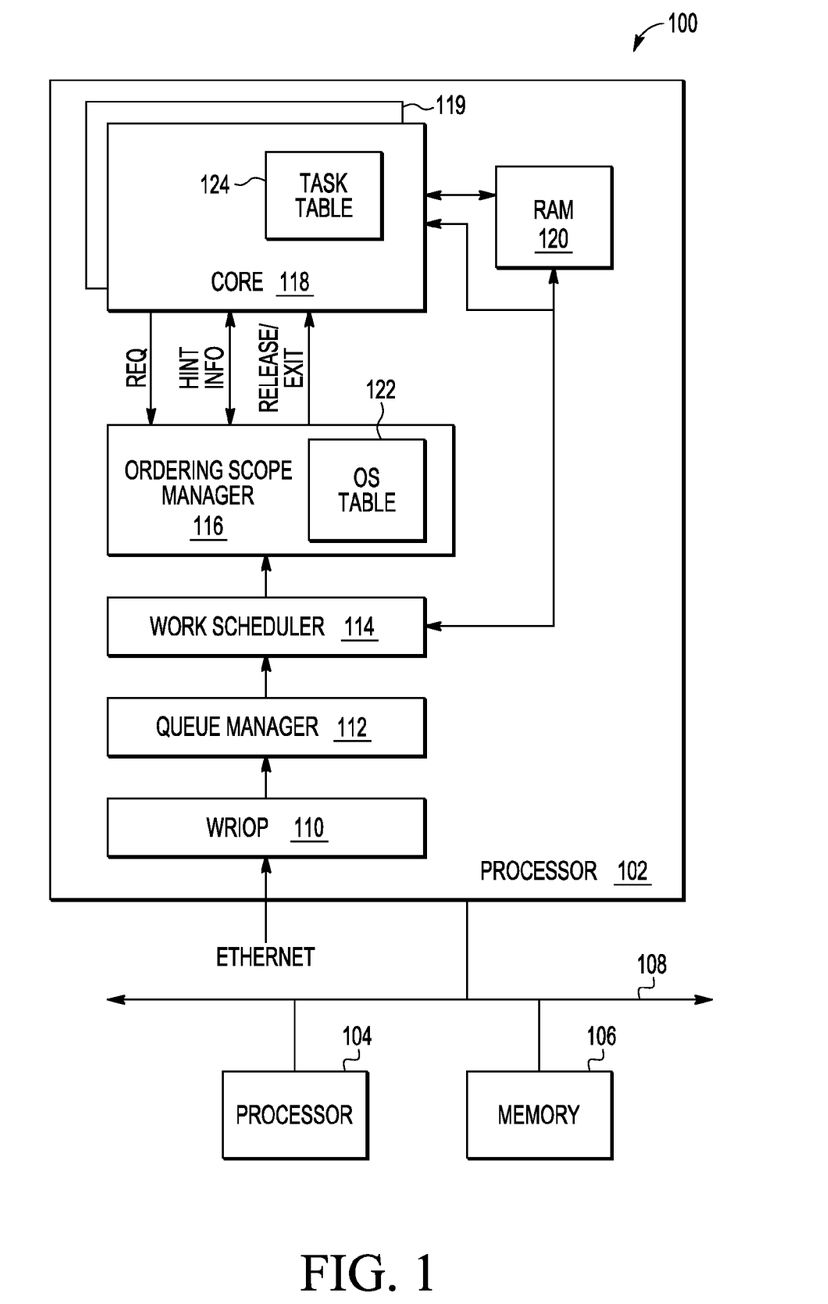
FIG. 1 illustrates a data processing system in accordance with at least one embodiment of the present disclosure.

FIG. 1 shows a circuit device, data processing system 100, in accordance with at least one embodiment of the present disclosure. The data processing system 100 includes various circuit portions including data processors 102 and 104, a memory 106, and a communication bus 108. The processor 102 includes an input/output module 110, such as Wire Rate Input/Output Processor (WRIOP), a queue manager 112, a work scheduler 114, an ordering scope manager 116, multiple processor cores, such as data processors 118 and 119 (also referred to herein as cores 118 and 119), and a random access memory (RAM) 120. The ordering scope manager 116 includes an ordering scope table 122. In an embodiment, the ordering scope table 122 can be a storage location that is local to the ordering scope manager 116. In an embodiment, the various features of processor 102, such as ordering scope manager 116, and cores 118 and 119, can be general purpose or special purpose processors that can be state machines, instruction based processors, other types of logic circuits capable of performing operations, and the like. By way of example, data cores 118 and 119 are presumed to be instruction-based processors. Each of the multiple cores of system 100 is presumed to be similar to core 118 as described herein, and, therefore, includes a task table 124 that includes information about its assigned tasks.

The processors 102 and 104 can communicate with each other and memory 106 via bus 108, and can store data to or receive data from the memory 106 via the bus 108. The processor 102 can also receive and send data packets, such as Ethernet data packets, from/to other devices via the input/output module 110, which may or may not be connected to the bus 108. The input/output module 110 classifies received Ethernet packets (data packets) and provides the packets to the queue manager 112, which in turn stores the data packet in a queue (not shown). During classification, the input/output module 110 can evaluate header information of a received data packet to determine a program to process the packet and to assign the packet data a particular program ID identifying the program. Examples of various programs that can execute on a data packet include programs that perform decryption, de-compression, compression, and the like. The queue manager 112 can create/remove queues to store the data packets based on the number of packet streams received at the processor 102. Thus, upon classification, the data packet is assigned to an existing queue for that particular data stream, or a new queue is created to which the data packet is assigned.

After data packets are placed in a queue, the work scheduler 114 can assign tasks, on a packet-by-packet basis, by assigning each one of the data packets and a corresponding program to a corresponding task that in turn is assigned to a processor core for execution. According to an embodiment, the work scheduler can provide task specific information to the ordering scope table 122 and to a task table 124 of one of the processor cores. An example of task information stored at ordering scope table 122 is illustrated at Table 1, below, which includes entries for active tasks at a time T0. A column of Table 1 labeled "Task" lists identifiers (Task IDs) for tasks of the processing system, where each row is associated with a different task. It will be appreciated that because there is a one-for-one relationship between tasks and entries of the ordering scope table 122, that an actual Task ID may not actually be stored at the ordering scope table 122, as each entry can correspond to an index value specific to a unique task (e.g., the first entry of table 122 can be understood to correspond to Task0). For convenience, only the active tasks are shown in the tables herein.

TABLE 1

| | | | | | | Ordering scope table (Time T0) |
|---|---|---|---|---|---|---|

| Task | OS ID | Exclusive | Transition Position | Exclusive Position | First In Scope | Incremental Scope Exclusive | Hint State |
|---|---|---|---|---|---|---|---|
| Task0 | OS1 | 1 | 0 | 0 | 1 | — | Invalid |
| Task1 | OS4 | 1 | 0 | 0 | 1 | — | Invalid |
| Task2 | OS1 | 1 | 1 | 1 | 0 | — | Invalid |
| Task3 | OS6 | 0 | 0 | — | 1 | — | Invalid |
| Task4 | OS1 | 0 | 2 | — | 0 | — | Invalid |

A column of Table 1 labeled "OS ID" indicates the active (current) ordering scope of each task (e.g., either the ordering scope being executed or to be executed by a processor core).

A column of Table 1 labeled "Exclusive" indicates whether a corresponding task executes in its current ordering scope exclusively or non-exclusively. According to a specific embodiment, only one task can execute exclusively in a given ordering scope at a time. Conversely, any number of tasks can execute non-exclusively in a given ordering scope. Thus, multiple tasks can non-exclusively execute concurrently in the same ordering scope—either by themselves or along with one task exclusively executing in the same ordering scope.

In the specific embodiment of Table 1, OS1 is the current ordering scope for Task0, Task2, and Task4. Task0 and Task2 are also indicated as exclusively executing in OS1, as indicated by a one (1) in their respective Exclusive columns. Task4 is indicated as non-exclusively executing in OS1, as indicated by a zero (0) in its Exclusive column. Note that information as to whether a task is to exclusively or non-exclusively execute in a particular ordering scope can be defined by the task's program, as will be described in greater detail below.

A column of Table 1 labeled "Transition Position" indicates an order that each task entered its indicated ordering scope relative to when other tasks in the ordering scope table entered the same ordering scope. According to an embodiment, the indicated order of the Transition Position can be used to indicate the order in which a task can exit out of its ordering scope relative to other tasks executing in the same ordering scope. Thus, in Table 1, a value of zero (0) is stored at the Transition Position field of Task0, Task1, and Task3 to indicate they are first-in-order tasks, relative to their respective ordering scopes—OS1, OS4, and OS6, respectively. Thus, each of these tasks will be the next task allowed to exit their respective ordering scopes because they were the first task assigned to their respective ordering scopes. However, in Table 1, Task2 has a Transition Position of one (1) because Task0 was assigned to the same ordering scope, OS1, before Task2. Similarly, Task4 has a Transition Position of two (2) because Task0 and Task2 were both previously assigned OS1.

A column of Table 1 labeled "Exclusive Position" indicates a relative order as to when a task with an asserted Exclusive field (e.g., a value of one (1)) is to be allowed to start exclusively executing in its indicated ordering scope relative other tasks waiting to exclusively execute in the same ordering scope. Thus, if the Exclusive field of a task is negated, its Exclusive Position has no meaning for that task. By way of example, the order that exclusive tasks are to be executed is presumed to be the same sequence as the tasks were assigned to the ordering scope table. Thus, in Table 1, a value of zero (0) is stored at Task0 and Task1 to indicate they are first-in-order, relative to their respective ordering scopes OS1 and OS4, for exclusive execution (first-in-execution-order), and a value of one (1) is stored at Task2 to indicate it is second-in-order for exclusive execution relative to OS2.

Columns labeled "First In Scope" and "Incremental Scope Exclusive" store information that can provide a hint (hint information) to a processor core as to whether a corresponding task assigned to the processor core can transition from its current ordering scope to a next ordering scope immediately and without performing a task switch. The First In Scope field stores a value that indicates whether or not a corresponding task is first-in-transition-order for its ordering scope, which occurs when the task was the first task of the ordering scope table to be enabled to begin execution. Thus, the First In Scope field of a task will be one (1) when the Transition Position field of the task is zero (0). Otherwise, the First In Scope field of the task will be zero (0) when the Transition Position field of the task is one (1) or greater.

The Incremental Scope Exclusive field stores a value that indicates whether or not the task will be able to execute exclusively or non-exclusively in a next anticipated ordering scope. According to an embodiment, the anticipated next-in-transition-order ordering scope of the task is the ordering scope having an OS ID that is determined by incrementing the current OS ID of the task. The Incremental Scope Exclusive field is asserted (e.g., a value of one (1)) to indicate the task will be able to execute exclusively, or non-exclusively, in the anticipated next ordering scope. The Incremental Scope Exclusive field is negated to indicate that the task will only be able to execute non-exclusively in the anticipated ordering scope. A dash (-) in the Incremental Scope Exclusive filed indicates that the value has not yet been determined.

The column labeled "Hint Status" provides a status indicator that pertains to the hint information at columns First In Scope and Incremental Scope Exclusive. A status indicator of "Invalid" indicates that hint information is not valid (e.g., has not been determined by the ordering scope manager 116). A status indicator of "Valid/Sent" indicates that hint information is valid (e.g., has been determined by the ordering scope manager 116), and has been sent to a processor core executing the task. A status indicator of "Valid/Received" indicates that hint information sent to a processor core of a task is being relied upon by the processor core executing the task. Use of the hint information will be discussed in greater detail herein.

As stated above, the information at different fields of each task entry in the ordering scope table can be utilized to determine whether a particular task is a current task or a pending task. In an embodiment, an active task is current unless a condition exists that prevents the task from starting execution of an ordering scope. For example, in Table 1, active Task2 is a pending task because it is prevented from executing in OS1 because its Exclusive Position field is set to one (1), which indicates that Task2 needs to execute in OS1 exclusively, and that another task is already exclusively executing in OS1. In different embodiments, the ordering scope table may have different entries (more or less) than described herein, and the ordering scope manager 116 can still utilize the ordering scope table 122 in substantially the same manner.

In addition to updating the ordering scope table 122 as packets are assigned to tasks, the work scheduler 114 also assigns the tasks to processor cores for execution. Information for each task assigned to processor core 118 by the work scheduler 114 is stored in a corresponding entry of task table 124. For example, Table 2 illustrates the state of task table 124 of processor core 118 at time T0, wherein processor core 118 has been assigned to execute tasks Task0, Task1, and Task2, as indicated by the task identifiers listed in the column labeled "Task".

TABLE 2

Task Table 124 for Processor Core 118 (Time T0)

| Task | Data Packet | Inhibit | Waiting | Exclusive Transition | Order Scopes |
|---|---|---|---|---|---|
| Task0 | DP1 | 1 | 1 | — | OS1, OS2, OS3 |
| Task1 | DP2 | 1 | 1 | — | OS4, OS5 |
| Task2 | DP4 | 1 | 1 | — | OS1, OS2, OS3 |

The work scheduler 114 further stores task information at each core's task table 124 that identifies the packet data being processed by the corresponding task, wherein this information can be used to access the actual packet data. For example, the column of Table 2 labeled "Data Packet" indicates the packet data being processed by each assigned task. In operation, this information can be an address, or other information that can be used to determine the address where the packet data is stored. Thus, the packet data for packet DP1 is to be processed by Task0, the packet data for a packet DP2 is to be processed by Task1, and the packet data for a packet DP4 is to be processed by Task2.

The work scheduler 114 also stores information at the task table 124 that indicates the location of the program code corresponding to the task that is to be used by the processor core to process the packet data. By way of example, this information is represented at Table 2 in the column labeled "Ordering Scopes". It will be appreciated, that only the program code location of the current ordering needs be stored in the task table 124, but for convenience of discussion, all of the ordering scopes of each task are listed. Thus, Task0 includes three ordering scopes: OS1, OS2, and OS3; Task1 includes two ordering scopes OS4 and OS5; and Task2 includes three ordering scopes: OS1, OS2, and OS3. Ordering scopes are struck-through in subsequent tables if their execution has been completed. Note, that the programs being executed by Task0 and Task2 are different instantiations of the same program code, and therefore most likely have the same sequence ordering scopes, though this is not a requirement.

The ordering scopes of a task can be defined by the program code based upon an understanding of a programmer or compiler as to the resources used by particular code portions when executed by a task. The ordering scopes of a task can be indicated in the task code through the use of ordering scope transition instructions that are located in the task software at an ordering scope boundary, such as at the last instruction of each ordering scope. An ordering scope transition instruction can indicate a next ordering scope of the task to be executed, if any, and whether the task is to exclusively execute in the next ordering scope. Thus, neither the processor cores nor the ordering scope manager need to have a priori knowledge as to the exclusivity of ordering scopes to be executed by a task. As mentioned previously, according to an embodiment, multiple tasks are not allowed to exclusively execute in the same ordering scope at the same time, thereby avoiding conflicts. Conversely, multiple tasks can be allowed to non-exclusively execute in the same ordering scope concurrently, along with up to one (1) exclusive ordering scope.

The column of Table 2 labeled "Inhibit" indicates whether processor core 118 is inhibited or enabled to execute a task corresponding to the entry. By way of example, a value of one (1) indicates the corresponding task is inhibited from executing in the indicated pending ordering scope, and a value of zero (0) indicates the corresponding task has been enabled to execute in the indicated ordering scope. Each processor core is assumed to be able to execute one enabled core at a time.

Columns labeled "Waiting" and "Exclusive Transition" can store information based upon hint information provided by the ordering scope manager. The Waiting field is asserted (e.g., one (1)), by default, to indicate the processor core needs to request permission from the ordering scope manager to exit a task execution in the current ordering scope, and needs to implement a task switch prior to transitioning to task execution in a different ordering scope. The Waiting field can be negated in response to receiving hint information from the ordering scope manager. A negated Waiting field indicates that, depending on the state of the task/ordering scope combination, the processor core may be able to transition immediately without a task switch (e.g., may not need to request permission to exit the current ordering scope, nor may it need to implement a task switch before transitioning).

The value of the Exclusive Transition field is "-" when the Waiting field is asserted (e.g., has a value of one (1)) to indicate that the field does not contain valid hint information. When the Waiting field is negated, the Exclusive Transition field is used by the processor core to determine whether it is necessary to wait before exiting a task, and whether a task switch is to be performed when exiting, as will be discussed in greater detail below.

Table 3 corresponds to the task table of a processor core other than processor core 118, presumed herein to be processor core 119. As illustrated, the second processor core has two tasks assigned thereto: Task3 that is to execute task program code that implements ordering scopes OS6, OS7, and OS8 to process packet data DP3; and Task4 that is to execute the same program code as Task0 and Task2 to process packet data DP5.

TABLE 3

Task Table for Processor Core 119 (Time T0)

| Task | Data Packet | Inhibit | Waiting | Exclusive Transition | Order Scopes |
|---|---|---|---|---|---|
| Task3 | DP3 | 1 | 1 | — | OS6, OS7, OS8 |
| Task4 | DP5 | 1 | 1 | — | OS1, OS2, OS3 |

Work scheduler 114 can assign a task to a particular core based on the resources used to perform the task, the availability of each processor core, and the like. The work scheduler 114 can continue defining and assigning tasks until no more data packets remain unassigned in the processor 102 or until all of the task table entries of the processor cores are full. In an embodiment, each processor core can have up to sixteen tasks assigned—one to each entry of its task table, wherein the data processing system 100 could have up to two hundred and fifty-six possible tasks, each one corresponding to an entry of the ordering scope table 122. The work scheduler 114, or other resources, can also retrieve the packet data from a queue, and store the packet data for each of the tasks in the RAM 120.

In an embodiment, the ordering scope manager 116 controls when tasks can execute in their various ordering scopes by responding to requests from the processor cores to execute various tasks. Beginning at Table 4, which illustrates a state of ordering scope table 122, an embodiment of exemplary operation is described beginning at an initial time T0 that is different from the embodiment described previously with respect Tables 1-3, which also was described with reference to a different initial time referred to as T0. Note that for ease of understanding, the example beginning with Table 4 does not use the hint feature associated with columns First In Scope, Incremented Scope Exclusive, and Hint State, which will be described later. Therefore, the Waiting Field is set to its default value for each task table entry, and the Incremental Scope Exclusive field and Hint Status field are indeterminate and Invalid, respectively, for each ordering scope table entry.

At time T0 of Table 4, in response a data packet being assigned to Task0, the state of the ordering scope table represented by Table 4 indicates that Task0 has been created. The current ordering scope of Task0 is OS1, the Exclusive field is asserted (e.g., set to one (1)) to indicate Task0 needs to execute exclusively in OS1, the Transition Position and Exclusive Position fields are each set to zero (0) to indicate Task0 is the first in order task for OS1, and the First In Scope field is set to one (1) by virtue of Task0 having a Transition Position value of zero (0). According to an embodiment, in response to receiving a request from processor core 118, the ordering scope manager 116 can notify the processor core 118, to which Task0 is assigned, that it is authorized to start executing the task. This notification can be provided by sending an enable signal to the processor core 118 to enable execution of Task0, by setting an indicator at a storage location that is monitored by the processor core 118, and the like.

TABLE 4

Ordering scope table (Time T0)

| Task | OS ID | Exclusive | Transition Position | Exclusive Position | First In Scope | Incremental Scope Exclusive | Hint State |
|---|---|---|---|---|---|---|---|
| Task0 | OS1 | 1 | 0 | 0 | 1 | — | Invalid |

In response to Task0 having been enabled (e.g., authorized/released by the ordering scope manager 116) the inhibit bit at the task table of core 118 has been set to zero (0), as shown in Table 5.

TABLE 5

Task Table 124 for Processor Core 118 (Time T0)

| Task | Data Packet | Inhibit | Waiting | Exclusive Transition | Order Scopes |
|---|---|---|---|---|---|
| Task0 | DP1 | 0 | 1 | — | OS1, OS2, OS3 |

In response to the inhibit bit of Task0 being zero (0), the processor core 118 can begin executing Task0 in ordering scope OS1, which can include retrieving the initial data packet, DP1, and the instructions associated with the Task0.

While Task0 is executing in OS1, the work scheduler 114 can assign one or more other data packets to tasks, which will be indicated in the ordering scope table 122. For example, at time T1, as indicated at the ordering scope table illustrated at Table 6, the work scheduler 114 has assigned four more data packets to tasks (Task1-Task4) in the manner described previously.

TABLE 6

Ordering Scope Table (Time T1)

| Task | OS ID | Exclusive | Transition Position | Exclusive Position | First In Scope | Incremental Scope Exclusive | Hint State |
|---|---|---|---|---|---|---|---|
| Task0 | OS1 | 1 | 0 | 0 | 1 | — | Invalid |
| Task1 | OS4 | 1 | 0 | 0 | 1 | — | Invalid |
| Task2 | OS1 | 1 | 1 | 1 | 0 | — | Invalid |
| Task3 | OS6 | 0 | 0 | — | 1 | — | Invalid |
| Task4 | OS1 | 0 | 2 | — | 0 | — | Invalid |

For ease of discussion, it is assumed that each of Task0-Task4 was assigned in order. Therefore, because Task0, Task1, and Task3 are each the first-in-order entry of the ordering scope table for their respective ordering scopes (OS1, OS4, and OS6), they each have a value of zero (0) in their Transition Position field, and the processor cores to which they are assigned can be enabled to execute these tasks. However, because Task2 and Task4 each have the same current ordering scope as a previous entry of the ordering scope table (OS1 of Task0), their Transition Position indicators in Table 6 are displayed as one (1) and two (2), respectively, to indicate they are the second and third tasks assigned to the ordering scope table having OS1 as their current ordering scope. According to an embodiment, the Transition Position indicators can be used by the ordering scope manger 116 to ensure tasks having the same ordering scope complete execution in the same order as they were received. Therefore, while Task2 cannot be enabled until Task0 completes exclusive execution in OS1, Task4 can be enabled because it is to non-exclusively execute in OS1.

The Exclusive Position indicators of Task0 and of Task1 are zero (0) to indicate that each is the first-in-order to exclusively execute at a processor core in its current ordering scope (OS1 and OS4, respectively). The Exclusive indicator of Task2 is one (1) to indicate that there was one other task (Task0) exclusively enabled to execute in its ordering scope (OS1) at the time Task2 was assigned. The Exclusive Position indicators of Task3 and Task4 are displayed as "-" to indicate this field has no meaning at Table 6 because these tasks are to non-exclusively execute in their respective ordering scopes. Thus, the ordering scope manager will not enable Task2 for execution until exclusive execution of Task0 has completed. Note that according to the embodiment described herein, execution of tasks in a common ordering scope can begin out of order relative to the time they were received, but will exit execution in the order they were received/assigned by the work scheduler 114. The value of an exclusive task's Exclusive Position indicator can be determined based upon the order that the task was created relative other exclusive tasks having the same ordering scope, or any other criteria.

At time T1, as indicated at Table 6, the First In Scope fields for Task0, Task1, and Task3 are all set to one (1) in response to their corresponding Transition Position indicators being set to zero (0). The First In Scope fields for Task2 and Task4 are set to zero (0) in response to their corresponding Transition Position indicators being set to a value other than zero (0) (e.g., they are not First In Scope tasks for their respective ordering scopes). As mentioned previously, the present example does not use hint information, and therefore the Incremental Scope Exclusive fields for Task0-Task4 are all set to initial states of "-" and the Hint State fields for Task0-Task4 are all set to an initial state of Invalid.

Table 7 and Table 8 are task tables for cores 118 and 119 at time T1 that correspond to the ordering scope table of Table 6. In particular, according to Table 7, the packet data DP2 and DP4 have been assigned to Task1 and Task2, respectively, both of which are assigned to core 118 for execution. According to Table 8, the packet data DP3 and DP5 have been assigned to Task3 and Task4, respectively, both of which are assigned to core 119 for execution.

TABLE 7

Task Table 124 for Processor Core 118 (Time T1)

| Task | Data Packet | Inhibit | Waiting | Exclusive Transition | Order Scopes |
|---|---|---|---|---|---|
| Task0 | DP1 | 0 | 1 | — | OS1, OS2, OS3 |
| Task1 | DP2 | 0 | 1 | — | OS4, OS5 |
| Task2 | DP4 | 1 | 1 | — | OS1, OS2, OS3 |

TABLE 8

Task Table 124 of Processor Core 119 (Time T1)

| Task | Data Packet | Inhibit | Waiting | Exclusive Transition | Order Scopes |
|---|---|---|---|---|---|
| Task3 | DP3 | 0 | 1 | — | OS6, OS7, OS8 |
| Task4 | DP5 | 0 | 1 | — | OS1, OS2, OS3 |

Based upon the ordering scope manager 116 evaluating each active task, as described with respect to Table 6, the processors have been enabled by the ordering scope manager 116 to execute Task0, Task1, Task3, and Task4, as indicated by their Inhibit fields being set to zero (0). Task2 is inhibited from executing as indicated by its Inhibit field being set to one (1). Once enabled, as indicated by a negated Inhibit field, the processor cores 118 and 119 can start executing the enabled tasks on a task-by-task basis without further intervention from the ordering scope manager. According to an embodiment, the enabled tasks are executed by their respective cores in the order that they reside in their core's task table. For example, if processor core 118 was to begin executing a task based on the information of Table 7, it would begin execution of Task0 by virtue of Task0 being enabled and being the first entry in task table 124. Similarly, processor core 119 would begin execution of Task3 by virtue of Task3 being enabled and being the first entry in task table for processor core 119.

Figure 2:
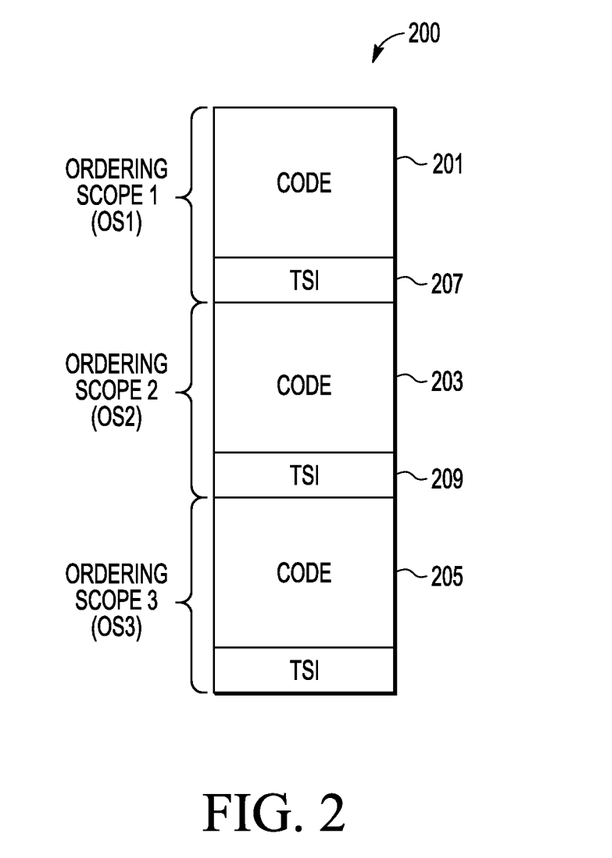
FIG. 2 illustrates the set of instructions of a task executed in a processor core of the data processing system of FIG. 1 in accordance with at least one embodiment of the present disclosure.

The enabled processor cores 118 and 119 can begin execution of a task by loading the program code (e.g., instructions for their respective task). For example, FIG. 2 illustrates a set of instructions 200 being executed at processor core 118, wherein the set of instructions 200 corresponds to Task0, and includes three code portions 201, 203, and 205 (code portions 201-205), each of which correspond to an ordering scope, such as ordering scopes OS1, OS2, and OS3. The last command of each of the task portions is a task switch instruction (TSI) that indicates the processor core 118 is to perform a task switch.

In response to finishing execution of the ordering scope OS1 code 201, the processor core 118 can execute of the task switch instruction 207. The task switch instruction 207 can include an incremental transition command that provides information to processor core 118 indicating the task wants to transition to a different ordering scope. Because no valid hint information has been provided in the task tables, as indicated by the Waiting field of each entry being asserted (e.g., set to one (1)), which is its default value, the processor core will not allow the task to exit execution from its current ordering scope until it receives permission from the ordering scope manager. For example, assuming processor core 118 executes instruction 207 (FIG. 2) for Task0 in OS1 (Task0/OS1), because the Waiting field of Task0 is asserted (Table 10) the processor core 118 must request and receive permission from the ordering scope manager 116 before exiting Task0/OS1. In addition, once authorized to exit Task0/OS1 the processor core must also implement a full task switch, which results in the current task's context information being stored to, and a next task's context information being restored from, context memory once permission to exit is received—even if the stored and restored context information is for the same task. Thus, an asserted Waiting field results in waiting for permission to exit a current task, and a full task switch in response to being authorized to exit the current task.

The processor core 118 can provide the request to exit Task0/OS1 to the ordering scope manager 116 via a request (REQ) line of the communication bus (shown in FIG. 1) between the processor core 118 and the ordering scope manager 116. In an embodiment, the communication bus can include the REQ line, a hint information line, and a release/exit line. In different embodiment, the ordering scope manager 116 can have separate communication buses to each processor core or a common communication bus for all of the processor cores.

The request to exit Task0/OS1 can include the ordering scope ID (e.g., OS2) for the next-in-order ordering scope in Task0 and an indicator as to whether the processor core 118 wants to execute exclusively or non-exclusively in ordering scope OS2.

When the ordering scope manager 116 receives the request to exit Task0/OS1, via the REQ line, the ordering scope manager 116 can determine whether to authorize core 118 to exit Task0/OS1 by determining if in-order execution, relative the task's ordering scope, will be maintained if Task0 is authorized to exit its current ordering scope OS1. According to an embodiment, this can be determined based on the Transition Position indicators of the tasks current enabled for execution in the current order ordering scope of Task0 (e.g., OS1). For example, if Task0 is the oldest task in-execution-order for OS1, which includes being the only task executing OS1, the ordering scope manager 116 allows the processor core 118 to complete the ordering scope OS1. Otherwise, the order scope manager 116 withholds authorization until any older tasks in the same ordering scope have been exited. In the present example, the ordering scope manager 116 can determine that the Transition Position field for Task0 is set to zero (0), such that the processor core 118 can exit Task0/OS1. The ordering scope manager 116 can then send an exit task authorization to the processor core 118 via the release/exit line of the communication bus.

When authorized by the ordering scope manager 116 to exit the current ordering scope (e.g., OS1), the core 118 can assert the inhibit bit 128 associated with the task table 124 as shown in Table 9 below at time T2. Note that OS1 is struck-through in Table 9 to indicate that the task has finished executing OS1, and that the next-in-order ordering scope (e.g., OS2) is now the pending ordering scope for Task0.

TABLE 9

Task Table 124 for Processor Core 118 (Time T2)

| Task | Data Packet | Inhibit | Waiting | Exclusive Transition | Order Scopes |
|---|---|---|---|---|---|
| Task0 | DP1 | 1 | 1 | — | OS1, OS2, OS3 |
| Task1 | DP2 | 0 | 1 | — | OS4, OS5 |
| Task2 | DP4 | 1 | 1 | — | OS1, OS2, OS3 |

After providing the exit task authorization to the processor core 118, the ordering scope manager 116 can update the fields for all of the tasks (e.g., Task0, Task2, and Task4) in the ordering scope table 122 that were effected by the processor core 118 exiting Task0/OS1, as indicated in Table 10.

TABLE 10

Ordering scope table (Time T3)

| Task | OS ID | Exclusive | Transition Position | Exclusive Position | First In Scope | Incremental Scope Exclusive | Hint State |
|---|---|---|---|---|---|---|---|
| Task0 | OS2 | 0 | 0 | — | 1 | — | Invalid |
| Task1 | OS4 | 1 | 0 | 0 | 1 | — | Invalid |
| Task2 | OS1 | 1 | 0 | 0 | 1 | — | Invalid |
| Task3 | OS6 | 0 | 0 | — | 1 | — | Invalid |
| Task4 | OS1 | 0 | 1 | — | 0 | — | Invalid |

For example, the ordering scope manager 116 can update the OS ID field of Task0 to identify OS2 as the ordering scope for Task0. The ordering scope manager 116 can also set the Exclusivity field of Task0 to a proper value based on the indication from processor core 118 as to whether Task0 is to be executed exclusively or non-exclusively in ordering scope OS2. Assuming that the request to exit Task0/OS1 provided by processor core 118 indicated non-exclusive execution of the next ordering scope OS2, the ordering scope manager 116 can set the Exclusivity field of Task0 to zero (0). Note that the Transition Position indicator for Task0 is zero (0) because Task0 is the only task in the ordering scope table currently associated with ordering scope OS2, and the Exclusive Position indicator for Task0 is "-" because Task0 is to execute non-exclusively with respect to OS2. Therefore, Task0 is the first-in-transition-order for ordering scope OS2. (Note that a task that is first-in-transition-order task for a given ordering scope will exit the given ordering scope before any other task exits in the given ordering scope. The term "first-in-transition-order" and "next in-transition-order", as used herein, are synonymous terms.) The ordering scope manager 116 can then provide the processor core 118 with a release of Task0 to non-exclusively execute in ordering scope OS2 via the release/exit line of the communication bus. In response to receiving the release from the ordering scope manager 116, the processor core 118 can then set the inhibit bit for Task0 to zero (0) in the task table 124 as indicated in Table 11 below.

The ordering scope manager 116 can also update the fields in the ordering scope table 122 that are associated with Task2 in response to processor core 118 exiting Task0/OS1. The Exclusive field for Task2 can remain set to one (1) and the Transition Position and Exclusive Position fields can both be set to zero (0) in response to Task2 now being the first-in-order task for ordering scope OS1. The ordering scope manager 116 can then provide the processor core 118 a release of Task2 to exclusively execute in ordering scope OS1, via the release/exit line of the communication bus, in response to the Exclusive Position field being set to zero (0).

The ordering scope manager 116 can then update the fields associated with Task4. For example, the Transition Position field for Task4 can be set to one (1) in response to the ordering scope table 122 including only one previously assigned task (e.g., Task2). The Exclusive and Exclusive Position fields can remain set to zero (0) and "-" respectively based on Task2 still non-exclusively executing in ordering scope OS1. The fields for Task1 and Task3 can remain unchanged in response to processor core 118 exiting Task0/OS1 based on the change in ordering scope for Task0 not effecting the ordering scopes of Task1 and Task3.

At time T3, as indicated at Table 10, the First In Scope fields for Task0-Task3 are all set to one (1) in response to their corresponding Transition Position indicators being set to zero (0). The First In Scope field for Task4 is set to zero (0) in response to its corresponding Transition Position indicator being set to a value other than zero (0) (e.g., it is not First In Scope task its ordering scope). As mentioned previously, the present example does not use hint information, and therefore the Incremental Scope Exclusive fields for Task0-Task4 are all set to initial states of "-" and the Hint State fields for Task0-Task4 are all set to an initial state of Invalid.

After completing execution of and exiting ordering scope OS1, processor core 118 determines a next task to begin executing based on the current information in the task table 124 as indicated in Table 11. Note that the next task can be the same task as was just finished but operating in a different ordering scope, or can be a different task from the previous task executed in the processor core 118. At time T3, as indicated at Table 11, the Inhibit bits of Task0-Task2 have been negated to indicate that the processor core 118 has been authorized by the ordering scope manager 116 to execute in any of the tasks Task0-Task2.

TABLE 11

Task Table 124 for Processor Core 118 (Time T3)

| Task  | Data Packet | Inhibit | Waiting | Exclusive Transition | Order Scopes |
|-------|-------------|---------|---------|----------------------|--------------|
| Task0 | DP1         | 0       | 1       | —                    | ~~OS1,~~ OS2, OS3 |
| Task1 | DP2         | 0       | 1       | —                    | OS4, OS5     |
| Task2 | DP4         | 0       | 1       | —                    | OS1, OS2, OS3 |

In an embodiment, the processor core 118 will preferentially execute tasks in its task table based upon a priority of each task. It is assumed herein that each of the tasks associated with a data stream have a common priority level and are, therefore, executed by their processor cores in the order they were received. It will be appreciated that non-data stream tasks may be given a higher priority than data stream tasks, such that the task switch instruction at the end of a current task's ordering scope results in the processor core switching tasks to execute the higher priority task before completing execution of the ordering scopes of the current task. Because the need to switch between tasks can occur frequently, integrated circuits can be designed with the expectation that a task switch is more likely to occur at the end of each ordering scope than not. Such a design can result in a task switch occurring with each occurrence of a task switch instruction in order to efficiently store and restore context information. While it is common for task switch operations to be highly efficient in terms of required clock cycles (e.g., one or two clock cycles), for applications that assign a substantial number of tasks to the same priority level, the mandatory task switch at the end of each ordering scope can result in unnecessarily storing and retrieving the task context information when the same task sequentially executes in adjacent ordering scopes.

Instead of the task switch instruction always causing task context information to be saved, execution of the task switch instruction can instead result in the processor core using hint information, provided by the ordering scope manager to selectively implement a task switch by storing or not storing the task's context information depending upon whether or not the processor core is to transition between or during scopes of the same task.

According to an example beginning with Table 12, the ordering scope manager 116 can provide task hint information to the processor cores that can be used to determine whether a next task switch instruction actually requires a full task switch to be performed that stores/restores the task context information. The hint information can also be used to determine if in response to the task hint instruction the processor core needs to request permission to transition to a new ordering scope.

Table 12 illustrates an ordering scope table (e.g., ordering scope table 122 of FIG. 1) at a time T4 having tasks Task10 through Task14. The ordering scope manager 116 has evaluated the tasks of Table 12 to determine if hint information can be provided to the processor cores to which various tasks have been assigned. The hint information of a task can be used by a processor core to determine whether it can immediately exit a particular ordering scope, without requesting permission, and avoid performing a full task switch. Otherwise, if no hint information is available for a task, the processor cores will need to request and receive permission to exit a current task executing in a particular ordering scope in the manner described above, which includes having to implement a full task switch.

TABLE 12

Ordering Scope Table (Time T4)

| Task | OS ID | Exclusive | Transition Position | Exclusive Position | First In Scope | Incremental Scope Exclusive | Hint State |
|---|---|---|---|---|---|---|---|
| Task10 | OS2 | 1 | 0 | 0 | 1 | 1 | Valid/Sent |
| Task11 | OS4 | 1 | 0 | 0 | 1 | 1 | Valid/Sent |
| Task12 | OS1 | 1 | 0 | 0 | 1 | 0 | Valid/Sent |

Only tasks having an asserted First In Scope field need to be evaluated by the ordering scope manager 116 for possible hint information, because only these tasks are eligible to actually be executed by their processor core as describe above. Thus, each of Task10 through Task12 of Table 12 have been evaluated by the ordering scope manager to determine whether hint information can be provided to processors executing these tasks, by virtue of their First In Scope fields being asserted.

Figure 3:
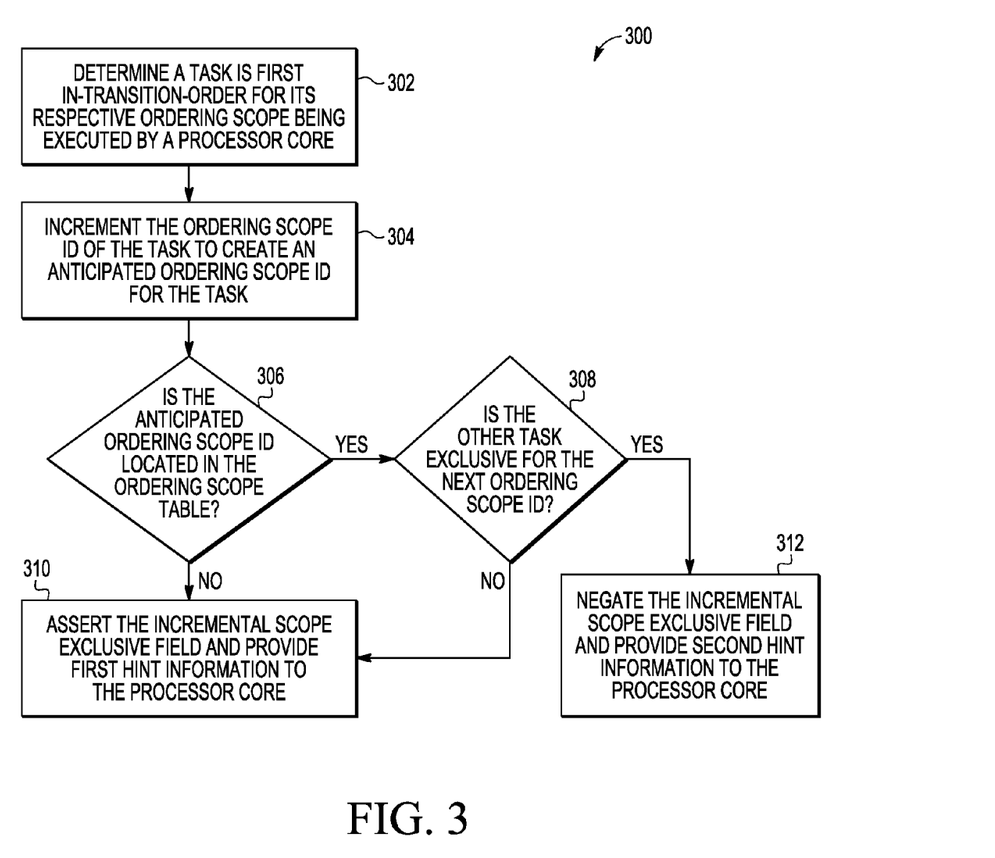
FIG. 3 illustrates a flow diagram of a method for evaluating a task by an ordering scope manager to determine whether it is associated with valid hint information within the data processing system of FIG. 1 in accordance with at least one embodiment of the present disclosure.

FIG. 3 illustrates a flow diagram of a method 300 that can be implemented by an ordering scope manager to determine whether a particular task of the ordering scope table is associated with valid hint information. At block 302, it is determined whether a task being evaluated is first in-transition-order for its respective ordering scope. For example, an ordering scope manager can determine that a task is first in-transition-order for its ordering scope if the task's Transition Position is zero (0), or if its First in Scope field is one (1). Tasks that are not first-in-transition-order do not need to be evaluated, and therefore have a Hint State of Invalid. Tasks that are first-in-order are evaluated further, beginning at block 304.

At block 304, an incremental OS ID of the current task is determined by incrementing the OS ID of the current task. The incremental OS ID of the current ordering scope is presumed by the ordering scope manager to be the OS ID of the ordering scope that is next-in-transition-order for the current task. For example, the incremental ordering scope ID for ordering scope OS1 is OS2, assuming the numerical suffix is incremented by 1 to identify the incremental ordering scope. In an embodiment, if the ordering scope ID for an ordering scope is 0b0000001, then the incremental ordering scope ID can be 0b0000010. By assuming the current task will transition to execute in ordering scope OS2, the ordering scope manager can provide hint information to the processor core assigned to the current task that can be used to determine if execution of the current task's task switch instruction requires requesting of permission from the ordering scope manager and a full task switch.

At block 306, it is determined whether the incremental ordering scope ID is associated with another task of the ordering scope table. If so, flow proceeds to block 308. Otherwise, if the incremental ordering scope ID is not in the ordering scope table, flow proceeds to block 310, where the Incremental Scope Exclusive field of the task being evaluated is asserted, and hint information indicating that the task's Waiting field can be negated and that its Exclusive Transition field can be asserted is provided to the processor core assigned to the task. By asserting the Exclusive Transition field of task table 124, it is indicated that the processor core executing the current task may be able to transition execution of the current task between ordering scopes without requesting permission to exit the current task, and without a task switch, so long as the processor core determines during execution of the task switch instruction of the current task that it is actually transitioning to execute the current task in its incremental ordering scope.

At block 308, in response to at lease one other task of the ordering scope table being associated with the incremental OS ID, it is determined whether the task(s) of the ordering scope table having the incremental OS ID is an exclusive task, as indicated by its Exclusive field being asserted. If not, flow proceeds to block 308 for processing as described previously. If so, flow proceeds to block 312, wherein the Incremental Scope Exclusive field is negated for the task being evaluated, and information is provided to the processor core indicating that the Waiting field and Exclusive Transition field of the task being evaluated can be negated. By negating these fields it is indicated that a processor can transition execution of a current task between ordering scopes without requesting permission to exit the current task, and without a task switch, so long as the processor core determines during execution of the task switch instruction of the current task that it is actually transitioning to non-exclusively execute the current task in its incremental ordering.

Thus, after being evaluated, each of Task10, Task11, and Task12 of Table 12 has valid hint information that has been sent to each task's corresponding processor core via the hint information line of the communication bus in FIG. 1, as indicated by the Hint State "Valid/Sent" at Table 13 and Table 14, which illustrate the state of task table 124 at processor cores 118 and 119, respectively.

TABLE 13

Task Table 124 for Processor Core 118 (Time T4)

| Task | Data Packet | Inhibit | Waiting | Exclusive Transition | Order Scopes |
|---|---|---|---|---|---|
| Task11 | DP21 | 0 | 0 | —/1 | OS4, OS5 |
| Task12 | DP22 | 0 | 0 | —/0 | OS1, OS2, OS3 |

TABLE 14

Task Table 124 for Processor Core 119 (Time T4)

| Task | Data Packet | Inhibit | Waiting | Exclusive Transition | Order Scopes |
|---|---|---|---|---|---|
| Task10 | DP20 | 0 | 0 | —/1 | ~~OS1,~~ OS2, OS3 |

As illustrated at Table 13, the Waiting field of Task11 has been set to zero (0) based upon the hint information received from the ordering scope manager, to indicate that the task has valid hint information, and that based upon the hint information the processor core may not have to request to transition from the ordering scope of the current task. The Exclusive Transition field of Task11 has a value of "–/1", where "-" is the current value of the field, and one (1) is the received hint value of the field that can be used by the processor core. Providing both the prior value and the hint value separated by a "/" indicates that the hint information is available, but the processor core has not relied upon the hint information. Once the hint information is relied upon, the processor core will notify to the ordering scope manager that it has received the newly hint information (e.g., provide an update indicator to the ordering scope manager). The hint value 1 in the Exclusive Transition field indicates that the processor can transition to either exclusively or non-exclusively execute the current task in the anticipated ordering scope (e.g., its incremented ordering scope) without requesting permission from the ordering scope manager and without performing a task switch.

The Waiting field of Task12 at Table 13 has been set to zero (0) based upon the hint information received from the ordering scope manager, to indicate that the task has valid hint information. The Exclusive Transition field of Task12 has a value of "–/0", where "-" is the current value of the field, and zero (0) is hint value of the field that may be considered by the processor core. The hint value of zero in the Exclusive Transition field indicates that the processor core can only transition to non-exclusively execute the current task in its incremented ordering scope without requesting permission from the ordering scope manager and without performing a task switch.

The Waiting field of Task10 of Table 14 has been set to zero (0) based upon the hint information received from the ordering scope manager. The Exclusive Transition field of Task10 has a value of "–/1", where "-" is the current value of the field, and one (1) is hint value of the field that may be considered by the processor core. The hint value one in the Exclusive Transition field indicates that the processor can transition to either exclusively or non-exclusively execute the current task in its incremented ordering scope without requesting permission from the ordering scope manager and without performing a task switch.

Table 15 represents the state, at time T5, of the ordering scope table 122 in the ordering scope manager 116. Table 16 and Table 17 represent the state, at time T5, of task tables 124 for processor core 118 and 119, respectively. The Hint State field of Task10 in Table 15 is Valid/Rcd to indicate that the processor core 119 is relying upon the previously provided hint information. This is further indicated in the Table 17 by virtue of Task10 having a value of one (1) in its Exclusive Transition field, instead of "–/1". Because processor 119 is relying upon this hint information, the ordering scope manager 116 updates Task10 in the ordering scope table as indicated by the bold indicators in Table 15. Thus, the current ordering scope in the OS ID field of Task10 has been updated to be OS3, even though OS2 is still being executed, which is indicated by the struck-through OS2 indicator. The Exclusive field of Task10 has been updated to a value of one (1) to match the Incremental Scope Exclusive indicator, and the Transition Position field and the Exclusive Position field have both been updated to 0.

TABLE 15

Ordering Scope Table (Time T5)

| Task | OS ID | Exclusive | Transition Position | Exclusive Position | First In Scope | Incremental Scope Exclusive | Hint State |
|---|---|---|---|---|---|---|---|
| Task10 | OS2 OS3 | 1 | 0 | 0 | 1 | 1 | Valid/Rcd |
| Task11 | OS4 OS5 | 1 | 0 | 0 | 1 | 1 | Valid/Rcd |
| Task12 | OS1 | 1 | 0 | 0 | 1 | 0 | Valid/Sent |

TABLE 16

Task Table 124 for Processor Core 118 (Time T5)

| Task | Data Packet | Inhibit | Waiting | Exclusive Transition | Order Scopes |
|---|---|---|---|---|---|
| Task11 | DP21 | 0 | 0 | 1 | OS4, OS5 |
| Task12 | DP22 | 0 | 0 | —/0 | OS1, OS2, OS3 |

TABLE 17

Task Table 124 for Processor Core 119 (Time T5)

| Task | Data Packet | Inhibit | Waiting | Exclusive Transition | Order Scopes |
|---|---|---|---|---|---|
| Task10 | DP20 | 0 | 0 | 1 | OS1, OS2, OS3 |

It will be appreciated that the updated Task10 information will be used by the ordering scope manager 116 to determine how to control future ordering scope transition requests and to determine current hint information. For example, the ordering scope manager 116 can re-evaluate hint information for tasks that have asserted First In Scope indicators to determine if their previously provided hint information needs to be updated, so long as the previously provided task hint information has not yet been relied upon by its processor.

Task11 has been updated at Table 15 and at Table 16 in a similar manner as Task10 in response to the processor core 118 relying upon its provided hint information. It will be appreciated, that according to an embodiment, a processor core will only rely upon hint information for a particular task once it has begun executing the task.

Task12 remains unchanged at Table 15 and Table 16. For example, because Task12 is not currently being executed by processor core 118, its hint information has not yet been relied upon.

Figure 4:
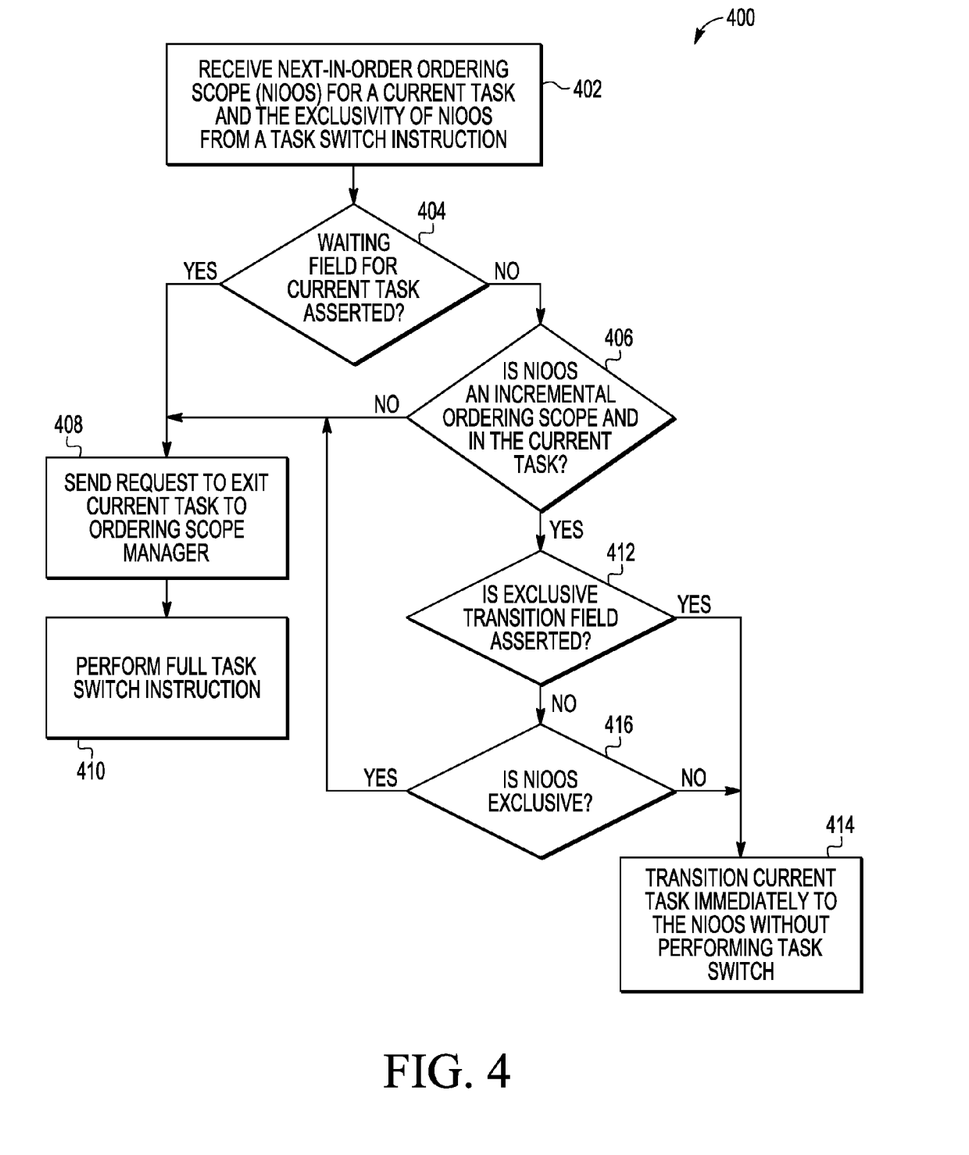
FIG. 4 illustrates a flow diagram of a method for determining whether an incremental ordering scope transition can be performed without a task switch in the processor core of the data processing system of FIG. 1 in accordance with at least one embodiment of the present disclosure.

In response to valid task information of a current task residing at a processor core's task table at the time a task switch instruction of the current task is executed, the processor core will determine if it can immediately begin executing the current task in the next ordering scope without performing a task switch. FIG. 4 illustrates a particular embodiment of a flow diagram of a method 400 that illustrates the manner a processor core can determine whether an ordering scope transition can occur immediately without a task switch. At block 402, task transition information for a currently executing task's next-in-order ordering scope is received at a processor core based upon execution of a task switch instruction. The information includes the ordering scope ID for the next-in-order ordering scope of the task and an exclusivity indicator of the next-in-order ordering scope. For example, execution of the task switch instruction of Task11/OS4 can indicate that execution of Task11 is to transition from OS4 to OS5.

At block 404, a determination is made whether a Waiting field for the currently executing task is asserted. If it is determined at block 404 that the Waiting field is negated for the currently executing task and that valid hint information exists, the flow proceeds to block 406. Otherwise, if the Waiting field is asserted, the hint information is not valid and the flow proceeds to block 408, wherein a request to exit the current task is sent from the processor core to the ordering scope manager, and a full task switch is performed at block 410 in response to permission to exit the current task being received. With respect to Task11, because its Waiting field is negated at Table 16, flow processed to block 406.

At block 406, a determination is made whether the next-in-order ordering scope received from the task switch instruction is the incremental ordering scope ID of the current task, as presumed by the ordering scope manager at the time the hint information was generated. If not, or if the processor core is to transition to a different task entirely, the flow proceeds to block 408 as described previously. If so, the hint information is relevant to the transition being performed, and the flow proceeds to block 412. With respect to Task11, the processor core will determine while executing the task switch instruction that the next ordering scope for Task11, OS5, is incremental to Task11's current ordering scope, OS4, and flow proceeds to block 412.

At block 412 a determination is made by the processor core whether the Exclusive Transition field for the current task is asserted. If so, the processor core can either exclusively or non-exclusively execute the current task in its incremental ordering scope, and flow, therefore, proceeds to block 414 where the current task is transitioned immediately to the next-in-order ordering scope without a task switch being performed. Otherwise, if the Exclusive Transition field for the current task is negated, the processor core can only non-exclusively execute the current task in its incremental ordering scope and flow proceeds to block 416. With respect to Task11, the processor core will determine that the Exclusive Transition field is asserted and will immediately transition as indicated at block 414.

At block 416, in response to the Transition field being negated, it is determined at the processor core whether a task switch instruction has indicated a task is to non-exclusively execute the incremental ordering scope. If so, flow proceeds to block 414 where the task is immediately transitioned to its incremental ordering scope without a task switch. Otherwise, flow proceeds to block 408 where the processor core requests permission to exit the current task in the manner previously described.

Thus, referring to Table 16, Task11 has valid hint information stored in the task table of its processor core that can be relied upon by processor 118, and can transition immediately to exclusively execute Task11 in OS5 as described with reference to FIG. 4. After transitioning, the processor core can re-assert the Waiting field in the task table 124 and clear the Exclusive Transition field for Task11 as indicated at time T6 in Table 18. The ordering scope OS4 for Task11 is also struck through to indicate that the ordering scope OS4 has been exited.

TABLE 18

Task Table 124 for Processor Core 118 (Time T6)

| Task | Data Packet | Inhibit | Waiting | Exclusive Transition | Order Scopes |
|---|---|---|---|---|---|
| Task11 | DP21 | 0 | 0 | — | OS4, OS5 |
| Task12 | DP22 | 0 | 0 | —/0 | OS1, OS2, OS3 |

The processor core 118 can also provide an indication to the ordering scope manager 116 to update the current ordering scope of Task5 in the ordering scope table 122 as indicated at time T7 in Table 19 below.

TABLE 19

Ordering Scope Table (Time T7)

| Task | OS ID | Exclusive | Transition Position | Exclusive Position | First In Scope | Incremental Scope Exclusive | Hint State |
|---|---|---|---|---|---|---|---|
| Task10 | OS2 OS3 | 1 | 0 | 0 | 1 | 1 | Valid/Rcd |
| Task11 | OS5 | 1 | 0 | 0 | 1 | 1 | Valid/Sent |
| Task12 | OS1 | 1 | 0 | 0 | 1 | 0 | Valid/Sent |

Note that at Time T7, not only has the information for Task11 been updated based on execution in OS5, but the ordering scope manager 116 has also evaluated Task11 to determine whether new hint information can be provided to processor core 118. Thus, as illustrated in Table 19, Task11 has valid hint information that has been sent to processor core 118 as indicated by the Hint State "Valid/Sent". Note that the hint evaluation of Task11 is based on the presumption that Task11 will next operate in incremental ordering scope OS6, which is an invalid assumption (see order scope information for Task11 at Table 18). Table 20 illustrates the resulting state of task table 124 at processor core 118 at time T7.

TABLE 20

Task Table 124 for Processor Core 118 (Time T7)

| Task | Data Packet | Inhibit | Waiting | Exclusive Transition | Order Scopes |
|---|---|---|---|---|---|
| Task11 | DP21 | 0 | 0 | —/1 | OS4, OS5 |
| Task12 | DP22 | 0 | 0 | —/0 | OS1, OS2, OS3 |

In particular, the Waiting field of Task11 has been set to zero (0) based upon the new hint information received from the ordering scope manager, to indicate valid hint information has been received. The Exclusive Transition field of Task11 has a value of "–/1", where "–" is the prior value of the field, and one (1) is hint value of the field based upon the hint information. The hint value one in the Exclusive Transition field indicates that the processor can transition to either exclusively or non-exclusively execute the current task in the anticipated incremental ordering scope without requesting permission from the ordering scope manager and without performing a task switch.

Table 21 represents the state at time T8 of the ordering scope table 122 in ordering scope manager 116. Table 22 represents the state at time T8 of task table 124 for processor core 118. The Hint State field of Task11 in Table 21 is Valid/Rcd to indicate that the processor core 118 has received, and is relying upon the provided hint information for Task11. This is further indicated in the Table 22 by virtue of task table 124 for processor core 118 having a value of one (1) in its Exclusive Transition field of Task11, instead of the value "–/1". Because the processor 118 is relying upon this hint information, the ordering scope manager 116 updates the entry in the ordering scope table for Task11 as indicated by the bold indicators in Table 21. Thus, the OS ID field has been updated to OS6, even though OS5 is still being executed; the Exclusive field has been updated to a value of one (1) to match the Incremental Scope Exclusive indicator; and the Transition Position field and the Exclusive Position field have both been updated to 0.

TABLE 21

Ordering Scope Table (Time T8)

| Task | OS ID | Exclusive | Transition Position | Exclusive Position | First In Scope | Incremental Scope Exclusive | Hint State |
|---|---|---|---|---|---|---|---|
| Task10 | ~~OS2~~ OS3 | 1 | 0 | 0 | 1 | 1 | Valid/Rcd |
| Task11 | ~~OS5~~ OS5 | 1 | 0 | 0 | 1 | 1 | Valid/Rcd |
| Task12 | OS1 | 1 | 0 | 0 | 1 | 0 | Valid/Sent |

TABLE 22

Task Table 124 for Processor Core 118 (Time T8)

| Task | Data Packet | Inhibit | Waiting | Exclusive Transition | Order Scopes |
|---|---|---|---|---|---|
| Task11 | DP21 | 0 | 0 | 1 | ~~OS4,~~ OS5 |
| Task12 | DP22 | 0 | 0 | —/0 | OS1, OS2, OS3 |

Thus, referring to Table 22, Task11 has valid hint information stored in the task table 124 of processor core 118 that is being relied upon by the processor core. In response to completing execution of Task11 in ordering scope OS5, the task switch instruction will indicate that the current task is to be exited, and that there is no other ordering scope in the present task. Because there is no next ordering scope for the current task, the hint information for Task11 is not relevant, and the processor core 118 sends a transition request to the ordering scope manager 116, and implements a full task switch when authorized to exit the current ordering scope.

As a result of the full task switch, the ordering scope manager 116 can authorize the processor core 118 to exit Task1 VOSS, which completes Task11, and results in Task11 being removed from the task table 124 of processor core 118 as indicated at time T9 in Table 23.

TABLE 23

Task Table 124 for Processor Core 118 (Time T9)

| Task | Data Packet | Inhibit | Waiting | Exclusive Transition | Order Scopes |
|---|---|---|---|---|---|
| Task12 | DP22 | 0 | 0 | —/0 | OS1, OS2, OS3 |

Processor core 118 can then begin executing the next enabled task (e.g., Task12/OS1) in the task table 124, which can cause the ordering scope table 122 and the task table 124 of processor core 118 to be updated at time T10 as indicated in Table 24 and Table 25, respectively. Also, at time T10 processor core 119 is continuing to exclusively execute Task10 in ordering scope OS2, as indicated in Table 17.

Table 24 represents the state at time T10 of the ordering scope table 122. Table 25 represents the state at time T10 of task table 124 for processor core 118. The Hint State field of Task12 in Table 24 is Valid/Rcd to indicate that the processor core 118 is relying upon the previously received hint information for Task12. This is further indicated in Table 25 by virtue of task table 124 for processor core 118 having a value of zero (0) in its Exclusive Transition field instead of the value "–/0". Because the processor 118 is relying upon this hint information, the ordering scope manager 116 updates the entry in the ordering scope table for Task12 as indicated by the bold indicators in Table 24. Thus, the OS ID of Task12 has been updated to be OS2, even though OS1 is still being executed; the Exclusive field of Task12 has been updated to a value of zero (0) to match the Incremental Scope Exclusive indicator; and the Transition Position field and the Exclusive Position field of Task12 have both been updated to 0.

TABLE 24

Ordering Scope Table (Time T10)

| Task | OS ID | Exclusive | Transition Position | Exclusive Position | First In Scope | Incremental Scope Exclusive | Hint State |
|---|---|---|---|---|---|---|---|
| Task10 | ~~OS2~~ OS3 | 1 | 0 | 0 | 1 | 1 | Valid/Rcd |
| Task12 | ~~OS1~~ OS2 | 1 | 0 | 0 | 1 | 0 | Valid/Rcd |

TABLE 25

Task Table 124 for Processor Core 118 (Time T10)

| Task | Data Packet | Inhibit | Waiting | Exclusive Transition | Order Scopes |
|---|---|---|---|---|---|
| Task12 | DP22 | 0 | 0 | 0 | OS1, OS2, OS3 |

Table 25 illustrates the hint information for Task12 assigned to processor core 118. Upon completion of execution of Task12, the task switch instruction will provide information to processor core 118 that Task12 is to transition to OS2 for exclusive operation. Because the Waiting field for Task12 is negated, there is valid hint information for Task12, and the processor core 118 determines whether the ordering scope ID of the next-in-order ordering scope (OS2) is the incremental ordering scope ID of the current task. In the present example, the ordering scope ID of the next-in-order ordering scope of Task12 is incremental so the Transition Exclusive field needs to be evaluated.

Because the Transition Exclusive field has been negated, the processor core 118 can only transition immediately to non-exclusively execute Task12 in its incremental ordering scope (OS2). Thus, because the requested task switch is exclusive, as directed by the task switch instruction, the processor core needs to request permission from the ordering scope manager 116 to transition to exclusively execute Task12 in OS2, and when permission is granted, processor 118 will implement the transition with a full task switch as described above.

In certain situations, a processor core can receive valid hint information for a current task after the current task has begun executing its current ordering scope's task switch instruction. In this situation, during the transition of the current task to its next ordering scope, the processor core will ignore the hint information, and instead request authorization from the ordering scope manager to implement the transition. When this occurs, the ordering scope manager provides a release signal in response to the request, and the processor core need not indicate that the late hint information was ever relied upon. In this manner, the late hint information does not inadvertently cause the processor core to perform an invalid incremental ordering scope transition.

It will be appreciated that the hint information sent from the ordering scope manager to the processor core is only a hint because there is no guarantee in the data processing system 100 that the state of the Waiting field and Exclusive field for a task will be set before the task switch instruction is executed, and if it is set in a timely matter the hint information will only facilitate transition when the actually transition ordering scope matches an anticipated ordering scope.

In an embodiment, the hint information for a task can be acknowledged by its processor core as soon as the core begins executing that task, even though the task switch instruction is yet to be encountered. In this situation, it may be desirable for the processor core to relinquish the hint information—provided the hint information has not been evaluated in the context of an actual task switch instruction. For example, if, after the ordering scope manager has received notice from one core that hint information for a particular task has been received, another processor core requests to transition into the ordering scope authorized by the acknowledged hint information, the ordering scope manager can send a request to the processor core that has acknowledged the hint to release the hint. For example, the processor core would rescind its acknowledgment of the hint so long as the task switch instruction of the task corresponding to the hint has not begun execution. In this situation, upon receiving notice that the processor core receiving the hint has relinquished the hint, the ordering scope manager can authorize the other processor core to exit its current task. Furthermore, by virtue of rescinding its acknowledgment of the hint, the original processor can re-assert its Waiting field.

Because there are multiple ways to save or not save task context information, the term "performing a task switch", as used herein with respect to transitioning from a task executing in a current ordering scope, is intended to mean that context information of the processor core executing the task in the current ordering scope is saved so that the context information can be subsequently retrieved to restore the processor core to the same context state. The terms "without performing a task switch", "not performing a full task switch", "ignoring a task switch", and their variants, as used herein with respect to transitioning from a task executing in a current ordering scope, is intended to mean that context information of the processor core executing the current task is not saved for subsequent retrieval. In alternate embodiments these terms can include/not include restoring context data for a test.

The process of providing a hint to the processor core can be performed with respect to both an ordering scope transition as described above and also with respect to a semaphore lock transition. During a semaphore operation the semaphore unit can perform the same operations as the ordering scope manager. However, for simplicity these operations have been discussed only with respect to an ordering scope manager and ordering scope transitions.

In accordance with one aspect of the present disclosure, a method is disclosed. The method includes storing a first ordering scope identifier at a first storage location of an ordering scope manager. In one embodiment, the first ordering scope identifier indicates a first ordering scope that a first task is operating in, and the first task is executed by a processor core. The method also includes, incrementing the first ordering scope identifier to create a new ordering scope identifier. The method further includes providing hint information from the ordering scope manager to the processor core in response to determining that that the first task is authorized to transition from the first ordering scope to a second ordering scope associated with the new ordering scope identifier. The method also includes transitioning the processor core to the second ordering scope without completing a task switch in response to the hint information being provided.

In one embodiment, the method also includes setting, by the ordering scope manager, a field in an ordering scope table associated with the first task to a first state indicating whether the first task is allowed to transition to the second ordering scope without completing the task switch. In one embodiment, the method further includes receiving an indicator that a second storage location of the processor core has been updated in response to the hint information. The method also includes setting the field associated with the first task to a second state indicating that the second storage location has been updated in response to receiving the indicator.

In one embodiment, the method further includes storing a third ordering scope identifier at the first storage location. In one embodiment the third ordering scope identifier indicates a third ordering scope that a second task is operating in, the second task being executed by the processor core. The method also includes incrementing the third ordering scope identifier to create a fourth ordering scope identifier. The method further includes providing second hint information from the ordering scope manager to the processor core in response to determining that that the second task is authorized to transition from the third ordering scope to a fourth ordering scope associated with the fourth ordering scope identifier. The method also includes transitioning the processor core to the fourth ordering scope without completing a task switch for the second task in response to the second hint information being provided.

In one embodiment, the first task is authorized to enter the second ordering scope based on the new ordering scope identifier not being found in an ordering scope table. In one embodiment, the first task is authorized to enter the second ordering scope based on another task in an ordering scope table concurrently executing in the second ordering scope. In one embodiment, the first task is authorized to enter the second ordering scope when the first task is to concurrently execute the second ordering scope based on a second task exclusively executing the second ordering scope.

In accordance with one aspect of the present disclosure, another method is disclosed. The method includes executing, at a processor core, a task switch instruction for a task in a current ordering scope. The method also includes transitioning the task from the current ordering scope to an incremental ordering scope of the task without completing a task switch in response a first storage location of the processor core being in a first state, otherwise requesting permission to exit the current ordering scope during the task switch in response to the first storage location being in a second state. In one embodiment, the first state indicates that the task is authorized to exit the current ordering scope.

In one embodiment, the method further includes determining that the task is to exclusively execute in the incremental ordering scope in response to information in the task switch instruction. In one embodiment, the method also includes determining that the task is to non-exclusively execute in the incremental ordering scope in response to information in the task switch instruction. In one embodiment, the method further includes providing, to an ordering scope manager, an update indicator that the processor core is relying on the first storage location of the processor core being in the first state from the processor core. In an further embodiment, the method includes providing an ordering scope identifier for the incremental ordering scope to the ordering scope manager in response to transitioning the task from the current ordering scope to the incremental ordering scope.

In accordance with one aspect of the present disclosure, a data processing system is disclosed. The data processing system includes a processor core configured to perform tasks on data packets. The data processing system also includes an ordering scope manager configured to communicate with the processor core. The ordering scope manager is configured to store a first ordering scope identifier at a first storage location. In one embodiment, the first ordering scope identifier indicates a first ordering scope that a first task is operating in. The ordering scope manager is further configured to increment the first ordering scope identifier to create a new ordering scope identifier, is configured to provide hint information to the processor core in response to determining that the processor core is authorized to transition the first task from the first ordering scope to a second ordering scope associated with the new ordering scope identifier, and is configured to transition from the first ordering scope to the second ordering scope without completing a task switch in response to the hint information being provided.

In one embodiment, the data processing system further includes a work scheduler configured to communicate with the processor core and with the ordering scope manager. The work scheduler configured to assign the first task to data of a data packet, and to assign the first task to the processor core. In one embodiment, the ordering scope manager is further configured to set a field of an ordering scope table associated with the first task to a first state to indicate whether the first task is allowed to transition to the second ordering scope without completing the task switch. In one embodiment, the processor core is authorized to transition the first task to the second ordering scope based on the new ordering scope identifier not being found in an ordering scope table.

In one embodiment, the processor core is authorized to transition the first task to the second ordering scope based on another task in an ordering scope table being concurrent for the second ordering scope. In one embodiment, the processor core is authorized to transition the first task to the second ordering scope when the first task is to concurrently execute the second ordering scope based on a second task exclusively executing the second ordering scope. In one embodiment, the first storage location is local to the ordering scope manager.

Based upon the description herein, it will be appreciated that the preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method comprising:
storing a first ordering scope identifier at a first storage location of an ordering scope manager, wherein the first ordering scope identifier indicates a first ordering scope that a first task is operating in, the first task being executed by a processor core;
incrementing the first ordering scope identifier to create a new ordering scope identifier;
in response to determining that that the first task is authorized to transition from the first ordering scope to a second ordering scope associated with the new ordering scope identifier, providing hint information from the ordering scope manager to the processor core;
setting a first storage location of the processor core to a first state in response to the hint information; and
in response the first storage location of the processor core being in the first state, transitioning the processor core to the second ordering scope without completing a task switch, otherwise requesting, by the processor core, permission to exit the current ordering scope during the task switch in response to the first storage location being in a second state.

2. The method of claim 1 further comprising:
setting, by the ordering scope manager, a field in an ordering scope table associated with the first task to a first state indicating whether the first task is allowed to transition to the second ordering scope without completing the task switch.

3. The method of claim 2 further comprising:
receiving an indicator that a second storage location of the processor core has been updated in response to the hint information; and
in response to receiving the indicator, setting the field associated with the first task to a second state indicating that the second storage location has been updated.

4. The method of claim 1 further comprising:
storing a third ordering scope identifier at the first storage location, wherein the third ordering scope identifier indicates a third ordering scope that a second task is operating in, the second task being executed by the processor core;
incrementing the third ordering scope identifier to create a fourth ordering scope identifier;
in response to determining that that the second task is authorized to transition from the third ordering scope to a fourth ordering scope associated with the fourth ordering scope identifier, providing second hint information from the ordering scope manager to the processor core; and
in response to the second hint information being provided, transitioning the processor core to the fourth ordering scope without completing a task switch for the second task.

5. The method of claim 1 wherein the first task is authorized to enter the second ordering scope based on the new ordering scope identifier not being found in an ordering scope table.

6. The method of claim 1 wherein the first task is authorized to enter the second ordering scope based on another task in an ordering scope table concurrently executing in the second ordering scope.

7. The method of claim 1 wherein the first task is authorized to enter the second ordering scope when the first task is to concurrently execute the second ordering scope based on a second task exclusively executing the second ordering scope.

8. A method comprising:
executing, at a processor core, a task switch instruction for a task in a current ordering scope; and
transitioning the task from the current ordering scope to an incremental ordering scope of the task without completing a task switch in response a first storage location of the processor core being in a first state, otherwise requesting permission to exit the current ordering scope during the task switch in response to the first storage location being in a second state.

9. The method of claim 8 wherein the first state indicates that the task is authorized to exit the current ordering scope.

10. The method of claim 8 further comprising:
determining that the task is to exclusively execute in the incremental ordering scope in response to information in the task switch instruction.

11. The method of claim 8 further comprising:
determining that the task is to non-exclusively execute in the incremental ordering scope in response to information in the task switch instruction.

12. The method of claim 8 further comprising:
providing, to an ordering scope manager, an update indicator that the processor core is relying on the first storage location of the processor core being in the first state from the processor core.

13. The method of claim 12 further comprising:
providing an ordering scope identifier for the incremental ordering scope to the ordering scope manager in response to transitioning the task from the current ordering scope to the incremental ordering scope.

14. A data processing system comprising:
a processor core, the processor core configured to perform tasks on data packets; and
an ordering scope manager configured to communicate with the processor core, the ordering scope manager configured to store a first ordering scope identifier at a first storage location, wherein the first ordering scope identifier indicates a first ordering scope that a first task is operating in, the ordering scope manager configured to increment the first ordering scope identifier to create a new ordering scope identifier, and in response to determining that the processor core is authorized to transition the first task from the first ordering scope to a second ordering scope associated with the new ordering scope identifier, configured to provide hint information to the processor core, wherein the hint information sets a first storage location of the processor core to a first state; and
in response the first storage location of the processor core being in the first state, the processor core is configured to transition from the first ordering scope to the second ordering scope without completing a task switch, otherwise the processor core to request permission to exit the current ordering scope during the task switch in response to the first storage location being in a second state.

15. The data processing system of claim 14 further comprising:
a work scheduler configured to communicate with the processor core and with the ordering scope manager, the work scheduler configured to assign the first task to data of a data packet, and to assign the first task to the processor core.

16. The data processing system of claim 14 wherein the ordering scope manager is further configured to set a field of an ordering scope table associated with the first task to a first state to indicate whether the first task is allowed to transition to the second ordering scope without completing the task switch.

17. The data processing system of claim 14 wherein the processor core is authorized to transition the first task to the second ordering scope based on the new ordering scope identifier not being found in an ordering scope table.

18. The data processing system of claim 14 wherein the processor core is authorized to transition the first task to the second ordering scope based on another task in an ordering scope table being concurrent for the second ordering scope.

19. The data processing system of claim 14 wherein the processor core is authorized to transition the first task to the second ordering scope when the first task is to concurrently execute the second ordering scope based on a second task exclusively executing the second ordering scope.

20. The data processing system of claim 14 wherein the first storage location is local to the ordering scope manager.

* * * * *